(12) United States Patent
Antreich

(10) Patent No.: US 6,796,594 B2
(45) Date of Patent: Sep. 28, 2004

(54) CONVERTIBLE WITH LOWERABLE HINGED ROOF

(75) Inventor: Michael Antreich, Germering (DE)

(73) Assignee: Open Air Systems GmbH, Stockdorf (DE)

( * ) Notice: Subject to any disclaimer, the term of this patent is extended or adjusted under 35 U.S.C. 154(b) by 0 days.

(21) Appl. No.: 10/627,602

(22) Filed: Jul. 28, 2003

(65) Prior Publication Data

US 2004/0017092 A1 Jan. 29, 2004

(30) Foreign Application Priority Data

Jul. 28, 2002 (DE) .......................................... 102 34 351

(51) Int. Cl.$^7$ ................................................. B60J 7/00
(52) U.S. Cl. .............................. 296/107.08; 296/37.16; 296/107.01
(58) Field of Search .................... 296/107.08, 37.16, 296/107.01, 108, 107.17, 76, 107.18, 146.14, 223, 107.07, 117, 107.09, 107.16, 116, 24.44; 224/324, 924

(56) References Cited

U.S. PATENT DOCUMENTS

| 4,277,097 A | * | 7/1981 | Lalanne | 296/37.16 |
| 4,819,982 A | * | 4/1989 | Eyb | 296/107.08 |
| 5,037,154 A | * | 8/1991 | Senba et al. | 296/37.16 |
| 5,864,214 A | * | 1/1999 | Brodsky | 296/107.08 |
| 6,010,178 A | | 1/2000 | Hahn et al. | |
| 6,030,023 A | * | 2/2000 | Guillez | 296/107.08 |
| 6,145,915 A | * | 11/2000 | Queveau et al. | 296/107.08 |
| 6,293,605 B2 | * | 9/2001 | Neubrand | 296/107.08 |
| 6,315,349 B1 | * | 11/2001 | Kinnanen | 296/107.01 |
| 6,364,396 B1 | * | 4/2002 | Hayashi et al. | 296/107.08 |
| 6,386,615 B2 | * | 5/2002 | Neubrand et al. | 296/107.08 |
| 6,419,308 B1 | * | 7/2002 | Corder et al. | 296/107.08 |
| 6,511,118 B2 | * | 1/2003 | Liedmeyer et al. | 296/107.08 |
| 6,604,774 B2 | * | 8/2003 | Koch et al. | 296/107.08 |
| 6,604,775 B2 | * | 8/2003 | Obendiek | 296/107.08 |
| 6,663,163 B2 | * | 12/2003 | Koch | 296/107.08 |
| 2003/0197395 A1 | * | 10/2003 | Reinsch | 296/107.08 |
| 2003/0222475 A1 | * | 12/2003 | Nakamitsu et al. | 296/37.16 |

FOREIGN PATENT DOCUMENTS

| DE | 44 45 941 C1 | 3/1996 |
| DE | 199 43 860 A1 | 3/2001 |

* cited by examiner

Primary Examiner—Kiran Patel
(74) Attorney, Agent, or Firm—Nixon Peabody LLP; David S. Safran

(57) ABSTRACT

A convertible with a roof (2) which can be opened and lowered into a rear roof storage space (3), has a trunk lid (5) which can be swung up at its forward edge to clear a through opening for the roof (2) which is to be lowered, and has a covering (11) which is movably supported on the trunk lid (5) and can be moved between a covering position in front of the trunk lid (11) with the roof opened (2) and a rear lowered position under the trunk lid (5) with the roof (2) closed. A movably supported shelf (20) occupies an operating position as a shelf which with the roof (2) closed and a lowered position at the front of the roof storage space (3) with the roof (2) opened.

10 Claims, 5 Drawing Sheets

CONVERTIBLE WITH LOWERABLE HINGED ROOF

BACKGROUND OF THE INVENTION

1. Field of the Invention

The invention relates to a convertible with a roof which can be opened and lowered into a rear roof storage space, with a trunk lid which can be swung up to clear a through opening for the roof which is to be lowered at its forward edge, and which has a covering which is movably supported on the trunk lid so that it can be moved between a front covering position in front of the trunk lid with the roof opened and a rear lowered position under the trunk lid with the roof closed.

2. Description of Related Art

U.S. Pat. No. 6,145,915 discloses a convertible with a hinged roof which can be opened, in which the covering is supported on the front edge of the trunk lid to be able to pivot around a transverse axis, so that its top, which faces upward in the front covered position, faces downward in the lowered position in which it has been swung-back under the trunk lid. When the roof is to be opened and lowered, before the front of the trunk lid is swung up, first the covering is pivoted to the rear, out of its front position as a shelf under the rear roof part, to under the trunk lid, for which considerable space is necessary in the stowage space under the shelf and in the roof storage space to enable this movement to be performed. The required swinging path must be kept open and is not available for other vehicle parts or for cargo.

U.S. Pat No. 6,030,023 discloses a convertible with an openable hinged roof, in which a shelf is pivotally supported on a partition which borders the trunk or the front of the roof storage space for clearing the path of motion for the roof which is to be lowered. The shelf can be moved between covering position, in which the shelf covers the opening between the front edge of the trunk lid and the partition, and an essentially vertical lowered position on the partition. The shelf contains a bearing arm which projects downward and which is supported on the support mounted on the partition to be able to pivot around a transverse axis such that the shelf is swung out of its upper covered position, forward and downward to the partition. The shelf is coupled to the trunk lid, for example, by means of a Bowden cable, so that the shelf is swung at the same time as when the trunk lid is swung up for lowering the roof. However, since the rear edge of the swinging shelf moves up, and thus, against the rear roof part, the structural layout of the roof and shelf is limited.

Published German Patent Application DE 199 43 860 A1 discloses a convertible with a covering device in which a cover part, which covers the convertible top storage space, is movably supported for clearing a through opening for the roof. Furthermore, there is a flat widened area which can be adjusted by means of a four-bar mechanism, between a lowered position under the cover part with the roof closed and a covered position in front of the cover with the roof opened. The four-bar mechanism, on either side, contains a quadruple hinge with two pivot rods which are supported to be able to pivot around pivot axes which are stationary on the cover part and which adjust the widened area in a combined swinging-pushing motion, so that the top of the widened area faces upward in each position. The possible displacement path of the widened area between its two end positions is limited by the length of the two connecting rods of the quadruple hinge, long rods requiring a large swinging path. The flat widened area with the roof closed adjoins the rear roof part from underneath.

SUMMARY OF THE INVENTION

A primary object of the present invention is to devise a convertible of the the initially mentioned type which has an improved covering for the through opening for the lowerable roof.

This object is achieved in accordance with the invention in that there is a movably supported shelf which, with the roof closed, occupies an operating position as a shelf, and with the roof opened, a lowered position in front of the roof storage space. Thus, the shelf is moved into its operating position with the roof closed when the roof storage space or convertible top compartment is not occupied by roof parts so that the path of motion of the shelf is not limited.

Preferably, the shelf in its lowered position is located adjacent to a partition in front of the roof storage space. The partition, for example, can be located directly behind the seats of the convertible or behind a stowage space behind the seats. In a simple configuration, the shelf is supported to be able to swing down around a front pivot axis in its lowered position. Thus, a simple pivot drive is enough to picot the shelf at its rear edge into its roughly horizontal operating position and into its roughly vertical or steeply inclined lowered position on the back of the partition.

Preferably, the covering with the bearing means is supported on the trunk lid such that it can be displaced, with the top facing upward, between its covered position in front of the trunk lid and its lowered position under the trunk lid. Due to this parallel swinging, a smaller space is sufficient for the swinging motion of the covering, which is also called the cover of the convertible top compartment. Feasibly, the bearing means contains a quadruple joint which has two pivot rods which swing in the lengthwise direction and which pivot on the trunk lid and the covering, each around pivot bearing axes which are stationary on the components.

In an alternative configuration, the bearing means comprises a pivoting and sliding mechanism with a front pivot lever which pivotally supports the front section of the covering on the trunk lid, and with a lengthwise guide which is located under the trunk lid and on which a support arm which projects from the rear section of the covering is supported to be able to pivot and slide. The covering can also be guided at its front edge on the lengthwise guide and can be supported at its rear edge with the pivot rod.

When feasible, the shelf and the covering have essentially the same size, the through opening to be covered can be closed alternately by the shelf and the covering, without other components.

A drive means for the shelf or for the covering preferably contains a hydraulic unit, a hydraulic rotary drive or an electric motor. Furthermore, to move the covering, there can be a drive means with a drive motor and tension/compression cables or a rack. On the other hand, the drive for displacing the covering or the shelf can be derived from the bearing mechanism of the trunk lid. In this case, there is no need for its own additional drive.

The convertible is explained in detail below with reference to the accompanying drawings using two embodiments for supporting the covering.

DETAILED DESCRIPTION OF THE INVENTION

Figure 1:
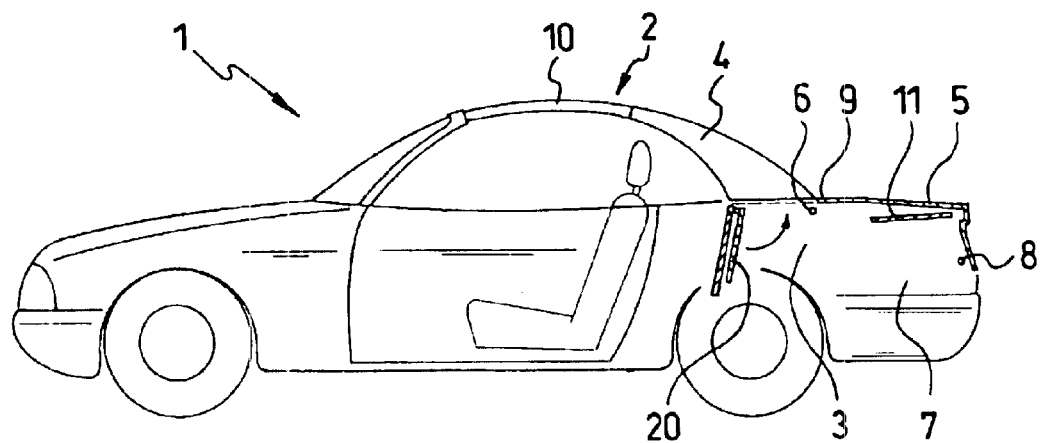
FIG. 1 is a schematic side view of a convertible with a hinged hardtop roof in the closed position.
Figure 2:
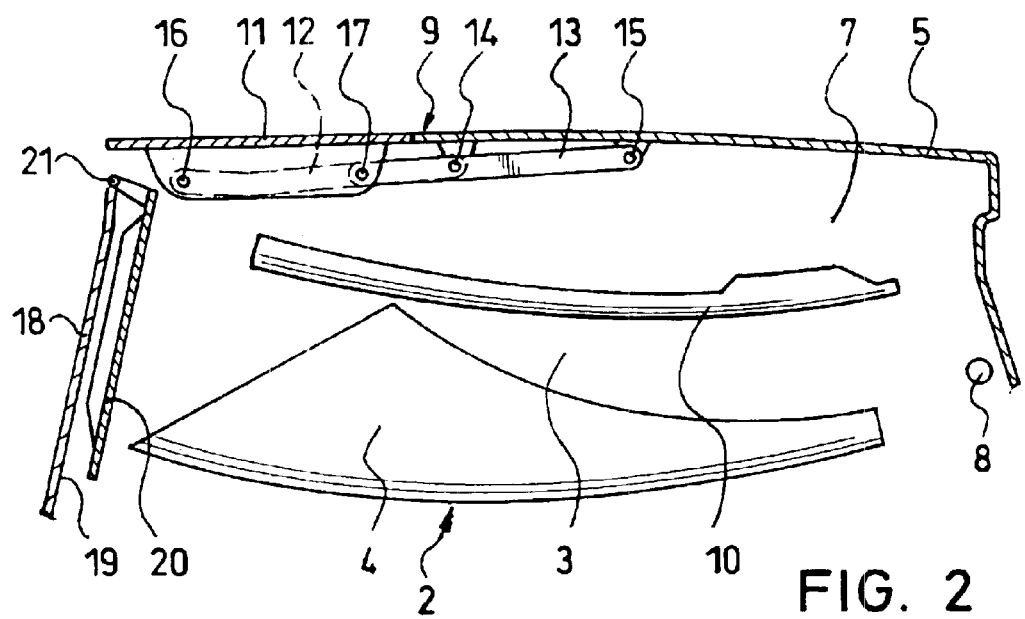
FIG. 2 is a schematic lengthwise section of the rear area of a convertible with a trunk lid which covers the lowered roof and a covering supported thereon in the covered position.
Figure 3:
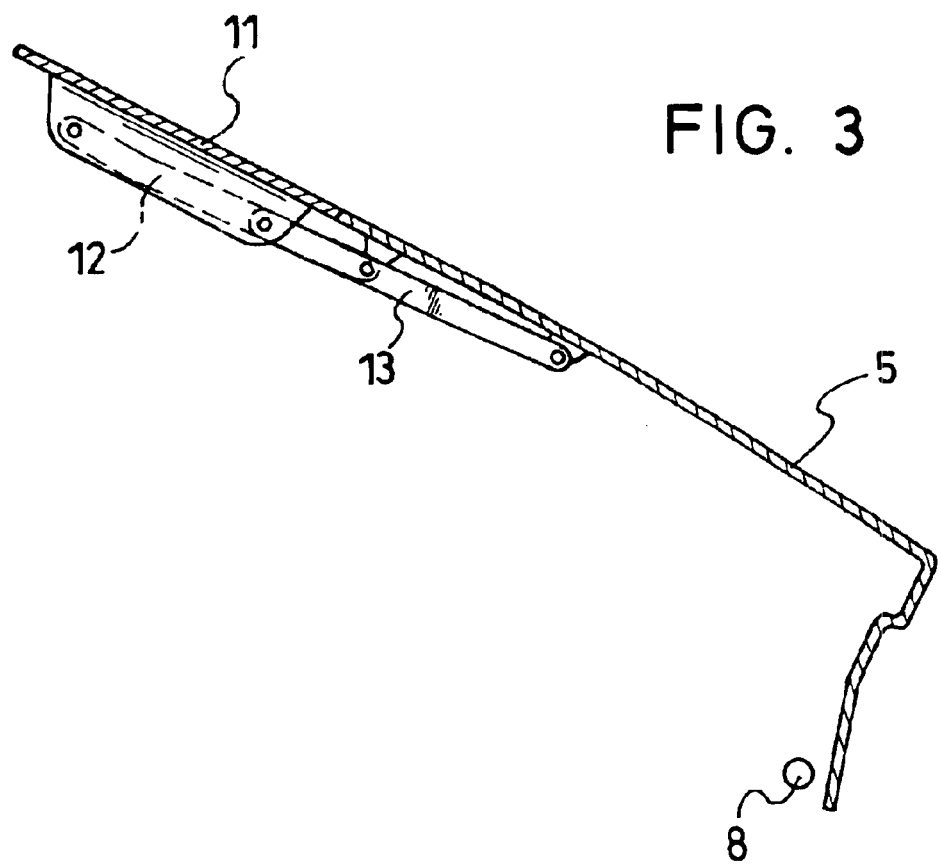
FIG. 3 shows the trunk lid of FIG. 2 swung up with the covering kept unchanged on the trunk lid.

A convertible motor vehicle 1 contains (see FIG. 1) a movable roof 2 which can lowered for opening between the closed position and an open position in which it is lowered in a rear storage space or convertible top compartment 3 (FIG. 2). The roof part 4, which is the rear one in the closed position of the roof 2, adjoins a trunk lid 5 which is supported to be able to pivot around a front pivot axis 6 (see FIG. 1) and can be swung up to clear a loading opening for loading and unloading the trunk 7. The roof 2, according to the embodiment shown, is a movable hardtop with several rigid roof parts located in succession in the closed position of the type disclosed generally, for example, in published German Patent application DE 199 43 860 A1 as a three-part roof, but can alternatively also be a flexible soft-top with a folding convertible top rod. In this regard, it is noted that the specific construction of the convertible roof itself form no part of this invention, which is directed to the manner in which access to the convertible top compartment 3, in which the roof is stored in its open position, is provided.

The trunk lid 5, which also covers the convertible top compartment 3 which occupies part of the trunk 7 according to the illustrated embodiment, is supported by a bearing means to be able to pivot around a rear pivot axis 8 and its forward edge 9 is swung up around the pivot axis 8 for clearing a through opening for the roof 2 so that the roof 2 can be lowered into the convertible top compartment 3 or can be withdrawn out of it. When, for example, a two-part hardtop roof 2 is lowered, the front roof part 10 is swung to under the rear roof part 4 and they are jointly lowered into the convertible top compartment 3. The rear roof part 4 is supported, for example, by means of a four-bar mechanism on the body.

Figure 4:
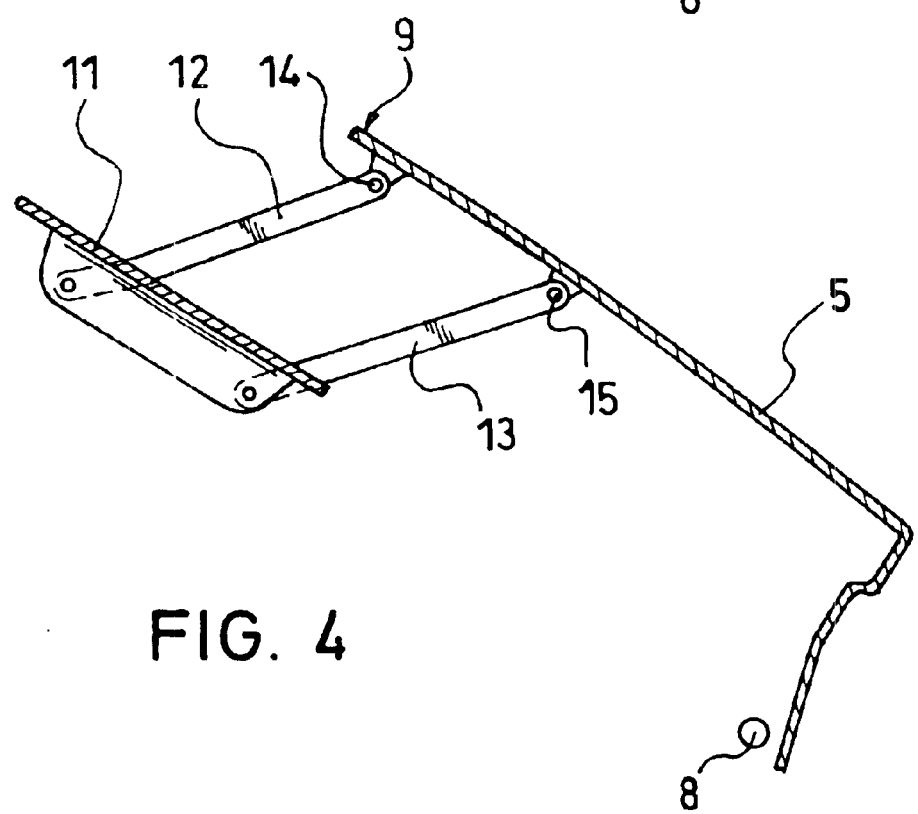
FIG. 4 shows the covering being swung under the trunk lid from the position shown in FIG. 3.
Figure 5:
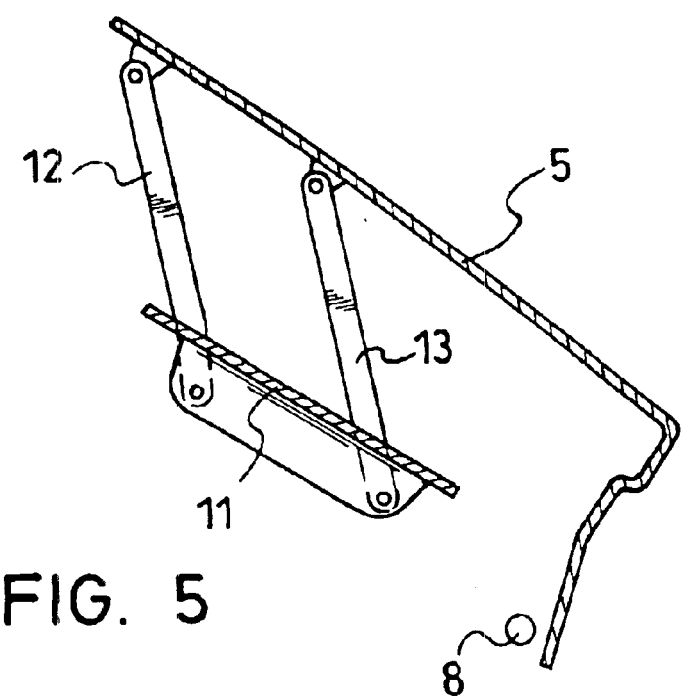
FIG. 5 shows the covering as swinging continues from the position shown in FIG. 4 to under the trunk lid.
Figure 6:
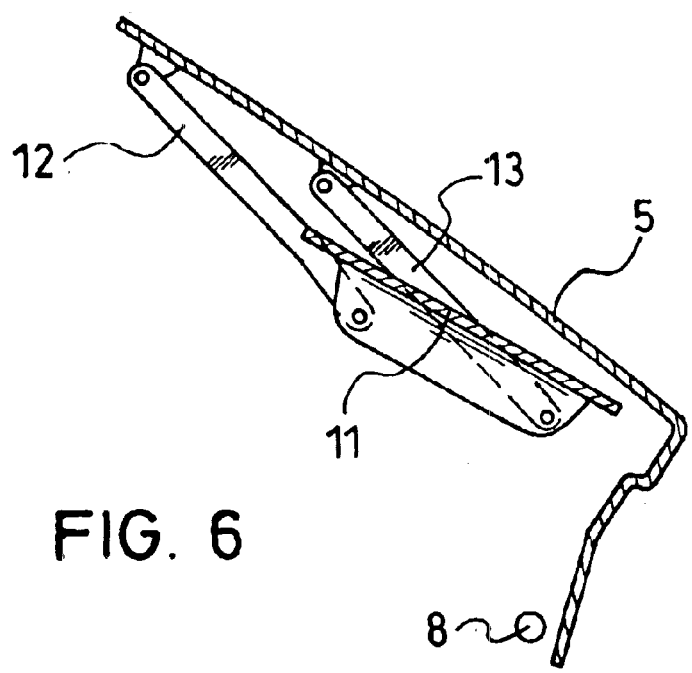
FIG. 6 the end position of covering, having swung further from the position shown in FIG. 5.
Figure 7:
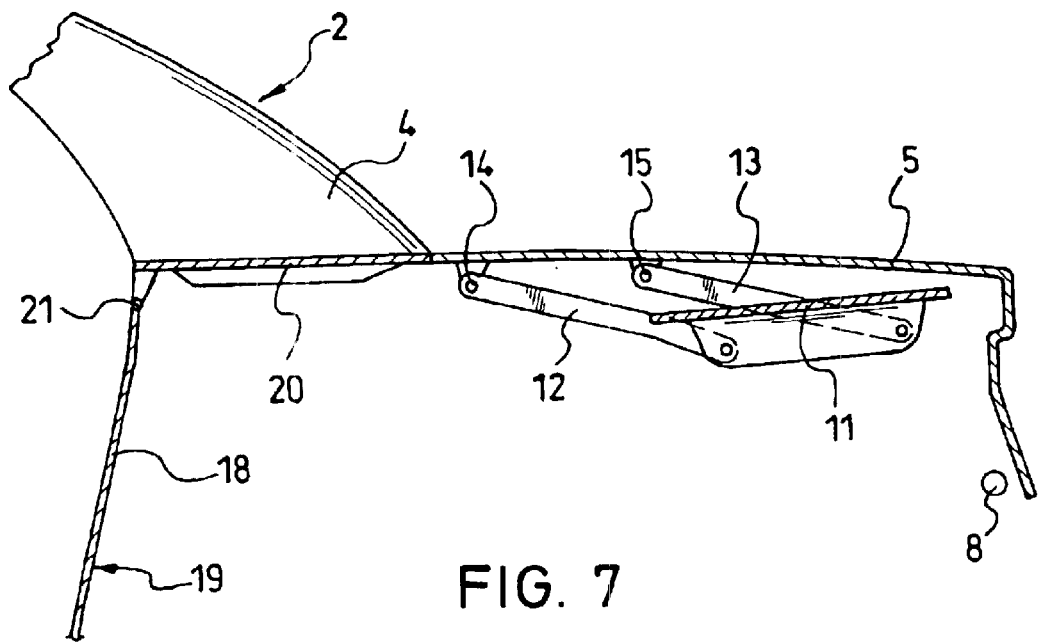
FIG. 7 shows a view corresponding to that of FIG. 2, but with the convertible roof closed, the trunk lid having been swung down, the covering being in its FIG. 6 position under the trunk lid, and the shelf having been swung up in its operating position.

A convertible top compartment cover 11 made as an additional covering is supported on the trunk lid 5 as a front flat widened area of the trunk lid 5 such that it can be moved between the lowered position under the trunk lid 5 with the roof 2 closed (FIG. 7) into a covered position in front of the trunk lid 5 in the direction of forward vehicle travel and flush with it with the roof 2 closed (FIG. 2). A bearing means for the cover 11 of the convertible top compartment contains a respective quadruple hinge underneath the trunk lid 5 at each side adjacent to its outside edge. This bearing means for the cover 11 comprises a front pivot lever 12 and a rear pivot lever 13 which, on the one hand, are coupled to the underside of the trunk lid 5 by pivot bearings 14, 15, and on the other hand, are connected to the cover 11, outward of its lateral outer edge, by pivot bearings 16, 17, so that, when the cover 11 of the convertible top compartment is swung (FIGS. 4 to 6), the pivot levers 12, 13 can move past the lateral outer edges of the cover 11 of the convertible top compartment 3. The top of the cover 11 of the convertible top compartment faces upward in both positions.

The front of the convertible top compartment 3 is bordered by a partition 18. A shelf 20 is provided at the back 19 of the partition 18, facing the convertible top compartment 3 in its lowered position with the roof 2 lowered (FIG. 2). The shelf 20 is supported to be able to pivot around an upper pivot axis 21 by means of a pivot bearing and can be swung up from the lowered position shown in FIG. 2 into its operating position as a shelf (FIG. 7), when the roof 2 occupies its closed position. The shelf 20, in its operating position, essentially occupies the position that was occupied by the cover 11 of the convertible top compartment which has now been swung down and rearward. In this configuration, in which a through opening for lowering the roof 2 can be closed, on the one hand by the cover 11 of the convertible top compartment with the roof 2 lowered, and on the other hand, by the shelf 20 with the roof 2 closed, the rear roof part 4 with the roof 2 closed can rest both on the front edge 9 of the trunk lid 5, a seal (not shown) resting on the trunk lid 5, and can also extend under the front edge 9, the seal being pressed from underneath against the front edge the trunk lid 5. The illustrated support of the cover 11 of the convertible top compartment 3 can comprise, in general, a multi-bar lever mechanism, such as, for example, a septuple hinge instead of a quadruple hinge.

The cover 11 of the convertible top compartment can be swung by its own drive means, for example, a hydraulic or electric drive, or by a drive derived from the drive of the trunk lid 5. The shelf 20 is moved, for example, by a control means in conjunction with an electric, hydraulic or mechanical drive depending on the motion of the trunk lid 5 and/or the lowering motion of the roof 2.

Figure 8:
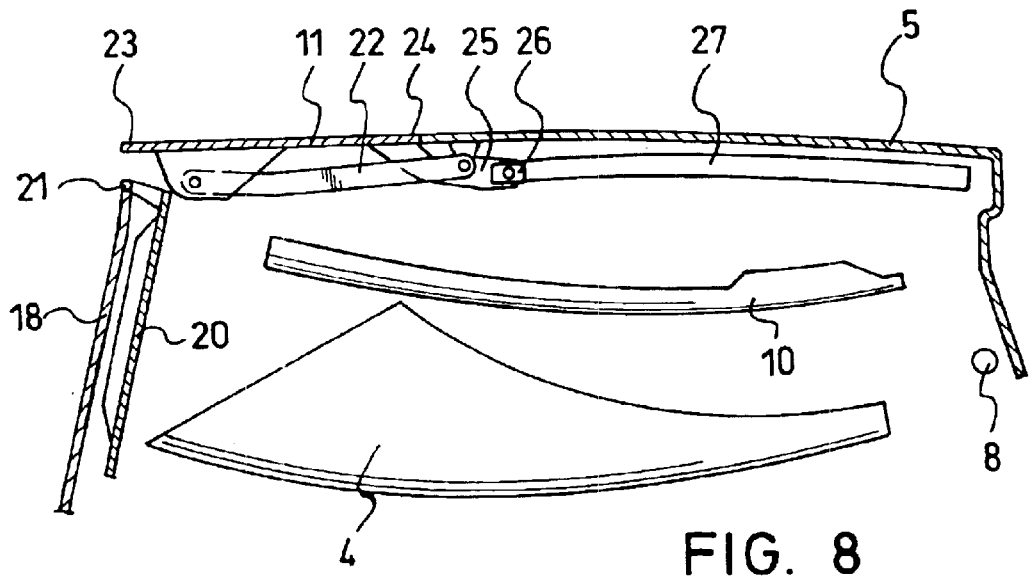
FIG. 8 is a view similar to that of FIG. 2, but showing a second embodiment of the support of the cover of the convertible top compartment with the roof lowered.
Figure 9:
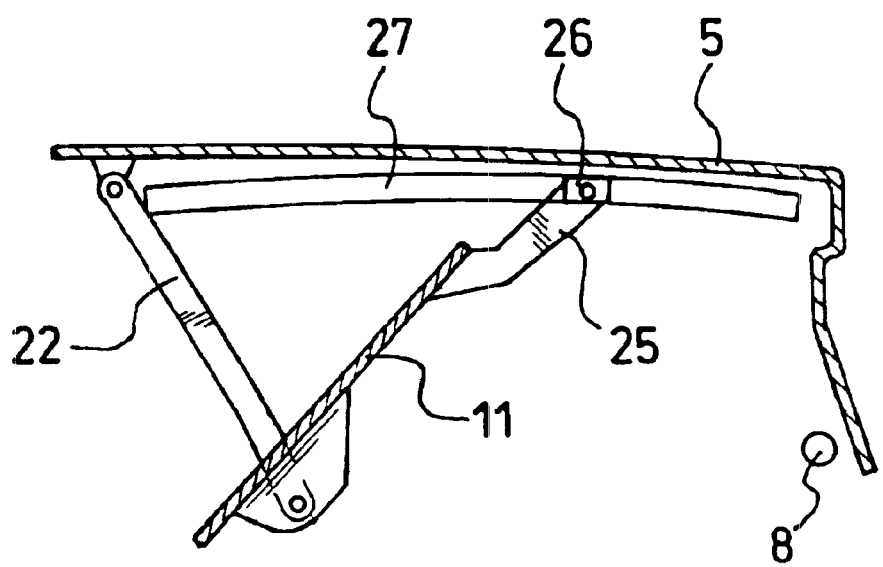
FIG. 9 is shows cover of the convertible top compartment in an intermediate position as it is being swung to under the trunk lid.

In one alternative configuration (see FIGS. 8 & 9), each lateral bearing means for the cover 11 of the convertible top compartment 3 encompasses a front pivot lever 22 (which is comparable to the pivot lever 12 of the above described quadruple hinge) for moving the front edge 23 of the cover 11 of the convertible top compartment 3. The support arm 25 is fixed on the rear edge area 24 of the cover 11 extending toward the rear and is pivotally supported at its rear end on a sliding piece or carriage 26 which is movably held in a lengthwise guide 27 which is located on the bottom of the trunk lid 5. A driving means for the cover 11 of the convertible top compartment is connected either to the front pivot lever 22 and pivots it or is connected to the rear support arm 25, for example, by means of a tension-compression cable and pushes it along the lengthwise guide 27, by which the front pivot lever 22 is also forcibly swung. The sequence of motions when opening and closing the roof 2 otherwise corresponds to that of the first embodiment.

What is claimed is:

1. Convertible, comprising
   a roof which is movable between a closed position covering a passenger compartment and an opened position lowered into a rear roof storage space,
   a trunk lid mounted to swing upward at a forward edge to clear a through opening for the roof to be lowered into the roof storage space,
   a covering which is movably supported on the trunk lid to move between a front position forward of the trunk lid with the roof opened and a rear lowered position under the trunk lid with the roof closed, and
   a shelf mounted to move between an operational raised position with the roof in the closed position and an inoperative lowered position at a front end of the roof storage space with the roof in the opened position.

2. Convertible as claimed in claim 1, wherein the shelf, in its lowered position, is located adjacent to a partition in front of the roof storage space.

3. Convertible as claimed in claim 1, wherein the shelf is mounted to swing down around a front pivot axis into its lowered position.

4. Convertible as claimed in claim 1, wherein the covering is supported on the trunk lid by a bearing means faces upward in front position and its lowered position.

5. Convertible as claimed in claim 4, wherein the bearing means comprises a four bar mechanism with a quadruple hinge and two pivot levers which swing in a lengthwise direction of the roof and each of which pivot around a respective pivot bearing axis fixed on the trunk lid and a respective pivot bearing axis fixed on the covering.

6. Convertible as claimed in claim 4, wherein the bearing means comprises a pivoting and sliding mechanism with a front pivot lever which pivotally supports a front section of the covering on the trunk lid, and with a lengthwise guide which is located on an underside of the trunk lid, and wherein a support arm projects from a rear section of the covering and is supported to move and pivot in the lengthwise guide.

7. Convertible as claimed in claim 1, wherein the shelf and the covering are of essentially the same size.

8. Convertible as claimed in claim 1, further comprising a drive means for moving of at least one of the shelf and the covering, said drive means having one of a hydraulic unit, a hydraulic rotary drive or an electric motor.

9. Convertible as claimed in claim 1, further comprising a drive means with a drive motor and a cable or rack transmission.

10. Convertible as claimed in claim 1, wherein a drive for movement of at least one of the covering and the shelf is derived from a bearing mechanism of the trunk lid.

* * * * *